United States Patent [19]

Deb et al.

[11] Patent Number: 5,028,250
[45] Date of Patent: Jul. 2, 1991

[54] GLASS SHEET HEATING FURNACE

[75] Inventors: Sugato Deb, Perrysburg; John C. Hovis, Elmore, both of Ohio; Michael L. Pollock, Petersburg, Mich.

[73] Assignee: Libbey-Owens-Ford Co., Toledo, Ohio

[21] Appl. No.: 584,469

[22] Filed: Sep. 18, 1990

Related U.S. Application Data

[62] Division of Ser. No. 485,643, Feb. 27, 1990, Pat. No. 4,983,202.

[51] Int. Cl.$^5$ ............................................. C03B 23/02
[52] U.S. Cl. ...................................... 65/289; 65/256; 65/273
[58] Field of Search ................ 65/102, 103, 106, 273, 65/118, 119, 104, 289, 244, 245, 256, 291, 268

[56] References Cited

U.S. PATENT DOCUMENTS

| | | | |
|---|---|---|---|
| 3,008,270 | 11/1961 | Hohmann et al. | 65/287 X |
| 3,162,520 | 12/1964 | Robinson | 65/287 X |
| 3,298,810 | 1/1967 | McKelvey | 65/287 X |
| 3,307,930 | 3/1967 | Stevens et al. | 65/290 X |
| 3,356,480 | 12/1967 | Golightly | 65/288 X |
| 4,341,546 | 7/1982 | Nitschker et al. | 65/273 X |
| 4,390,358 | 6/1983 | Friedingsdorf | 65/119 X |
| 4,416,679 | 11/1983 | Friedingsdorf | 65/119 X |
| 4,591,374 | 5/1986 | Klemola | 65/356 X |
| 4,608,073 | 8/1986 | Ford et al. | 65/273 X |

Primary Examiner—Robert L. Lindsay
Attorney, Agent, or Firm—Marshall & Melhorn

[57] ABSTRACT

The invention comprises a tunnel-type heating furnace of modular construction for heating glass sheets carried therethrough in succession on a series of aligned rollers. The furnace enclosure includes a lower section of generally rectangular cross-section beneath the rollers and an upper section, which is of generally elliptical configuration in cross-section, above the rollers. The upper enclosure section is vertically retractable by means of a jack mechanism to facilitate maintenance and changing of the rollers. The rollers include shafts at their opposite ends having bearings adapted to be received and supported in upwardly opening recesses in roll support plates extending along either side of the furnace. A toothed gear or sprocket is affixed to the end shaft at one end of each roller. The rollers are driven in groups by timing belts whose upper flights extend over and engage the toothed gears. Hold down assemblies removably carried by the roll support plates include cam rollers positioned intermediate each pair of toothed gears for urging the timing belts downwardly into driving engagement with the toothed gears. A differential heating assembly may be provided for modifying the heating pattern beneath the elliptical upper enclosure section.

2 Claims, 4 Drawing Sheets

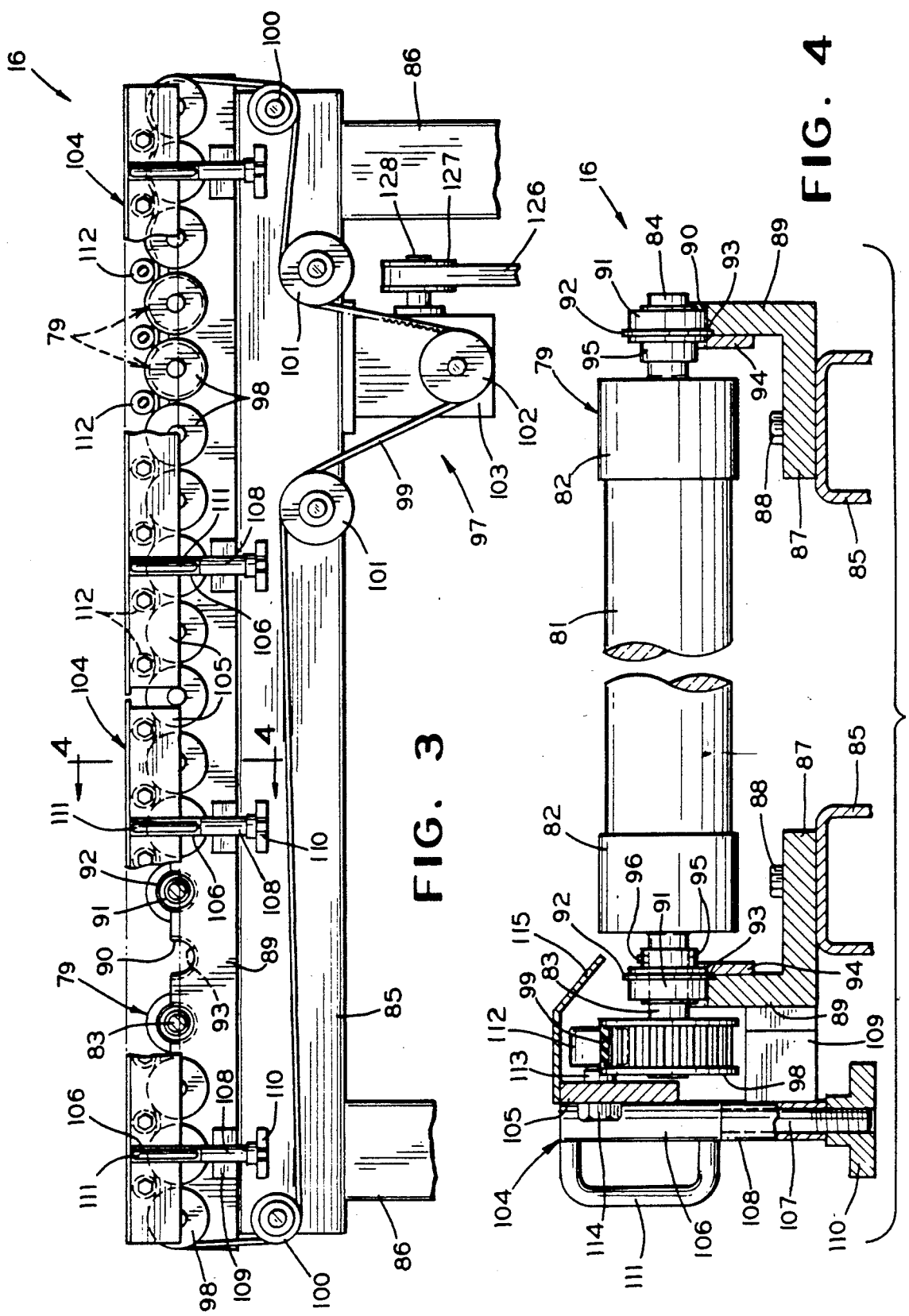

GLASS SHEET HEATING FURNACE

This is a division of application Ser. No. 07/485,643, filed Feb. 27, 1990 now U.S. Pat. No. 4,983,202 granted 1/8/91.

BACKGROUND OF THE INVENTION

1. Field of the Invention

The present invention relates to glass sheet heating furnaces of the elongated tunnel-type, wherein glass sheets are heated as they are conveyed therethrough upon a series of aligned rollers in preparation for subsequent treatment steps such as bending, tempering and annealing. More particularly, the invention pertains to such furnaces incorporating improved glass sheet heating and conveying means.

2. Description of the Prior Art

Glass sheets for use in the automotive industry are typically heated to their softening point, and then bent to a prescribed configuration dictated by the design of the automobile in which they are to be installed. After bending, the sheets which are to be employed as side lites and back lites are typically subjected to rapid chilling so as to develop a desired degree of temper for producing an acceptable break pattern. Sheets which are to be employed as windshields are gradually cooled so as to be annealed, and then laminated to another sheet or sheets in various combinations by means of a plastic interlayer.

Early glass sheet heating furnaces generally comprised an elongated refractory chamber of rectangular cross section through which the sheets were conveyed in succession upon a series of spaced metallic rolls. Heat was provided by suitable gas or electric heating elements positioned in the roof and side walls to, in turn, heat the interior of the furnace. The walls and roof were stationary members built up of refractory blocks. The rolls extended across the furnace and were supported in journals located outside the side walls. A worm gear affixed to one end of each roll drivingly engaged a worm wheel on a drive shaft running along and mounted for rotation adjacent a side wall of the furnace. Such conveyor systems, while being mechanically sound, were relatively expensive to build and maintain, and did not readily admit changing of individual rolls should that be necessary. In addition, the furnaces were not readily adapted to producing individualized heating patterns for glass sheets having different configurations and requiring different thermal characteristics.

Rolls having ceramic glass contacting surfaces were found to have significant advantages over metallic rolls in the conveying of the sheets through the furnace. Initially, the ceramic rolls were mounted and driven in a manner similar to the metallic rolls. However, it was found that such rolls more frequently require refurbishing to maintain their glass contacting surface in a suitable condition, so that it is occasionally necessary to remove and replace individual rolls or groups of rolls. This was very difficult and time consuming with the worm wheel and line shaft drive system, resulting in extended periods of lost production. In order to facilitate changing of the rolls, so-called friction drive systems were devised wherein the rolls rest at each end, outside the furnace enclosure, upon longitudinally extending belts. The ends of the rolls are restrained against longitudinal movement so that as the flights of the belts upon which the rolls rest are advanced, the rolls are driven in rotation. Changing of rolls and access to the furnace interior was further improved by the development of furnaces whose upper sections, that is, the portion above the roll line, comprises a vertically retractable assembly. In order to, among other things, improve heating efficiency and temperature control, it has been proposed to construct such furnaces in which either or both the lower and upper sections are of semi cylindrical configuration in cross-section.

SUMMARY OF THE INVENTION

In accordance with the present invention, there is provided a glass sheet heating furnace comprising a sectional or modular elongated tunnel-type enclosure through which individual glass sheets are carried in succession upon a series of aligned rollers. The furnace enclosure includes a lower section generally rectangular in cross-section, and an upper section whose interior surface facing the glass sheets travelling through the furnace is of a generally elliptical configuration in cross-section. The aligned rollers are positioned at the juncture of the upper and lower furnace sections, and the upper section is vertically retractable by a jack mechanism for providing access to the rollers and the furnace interior.

The rollers are of ceramic material and are provided at their opposite ends with end caps including shafts having bearings adapted to be received in upwardly opening recesses in roll support plates extending along either side of the furnace. At one end each roll has a toothed gear or sprocket affixed to the end shaft. The rolls are driven in groups by means of timing belts whose upper flights extend over and engage the toothed gears Hold down assemblies removably carried by the roll support plates include cam rollers positioned intermediate each pair of adjacent toothed gears for urging the timing belts downwardly into driving engagement with the toothed gears. Individual rollers can be removed and replaced by raising the upper furnace section, removing the appropriate hold down assembly to disengage the timing belt, lifting the roller to disengage the end bearings from the recesses in the side support plates, and withdrawing the roller and inserting another in its place.

In accordance with another aspect of the invention, provision is made for selectively varying the heating pattern across the furnace. To that end, a differential heating assembly may be provided above the roller conveyor beneath the elliptically shaped upper section of the furnace enclosure.

BRIEF DESCRIPTION OF THE DRAWINGS

In the drawings, wherein like numerals are employed to designate like parts throughout:

FIG. 3 is an enlarged, fragmentary side elevational view of a portion of the roller mounting and drive mechanism of the invention;

FIG. 4 is an enlarged, transverse view of the roller conveyor, partially in section, taken substantially along line 4—4 of FIG. 3;

DESCRIPTION OF THE PREFERRED EMBODIMENTS

Figure 1:
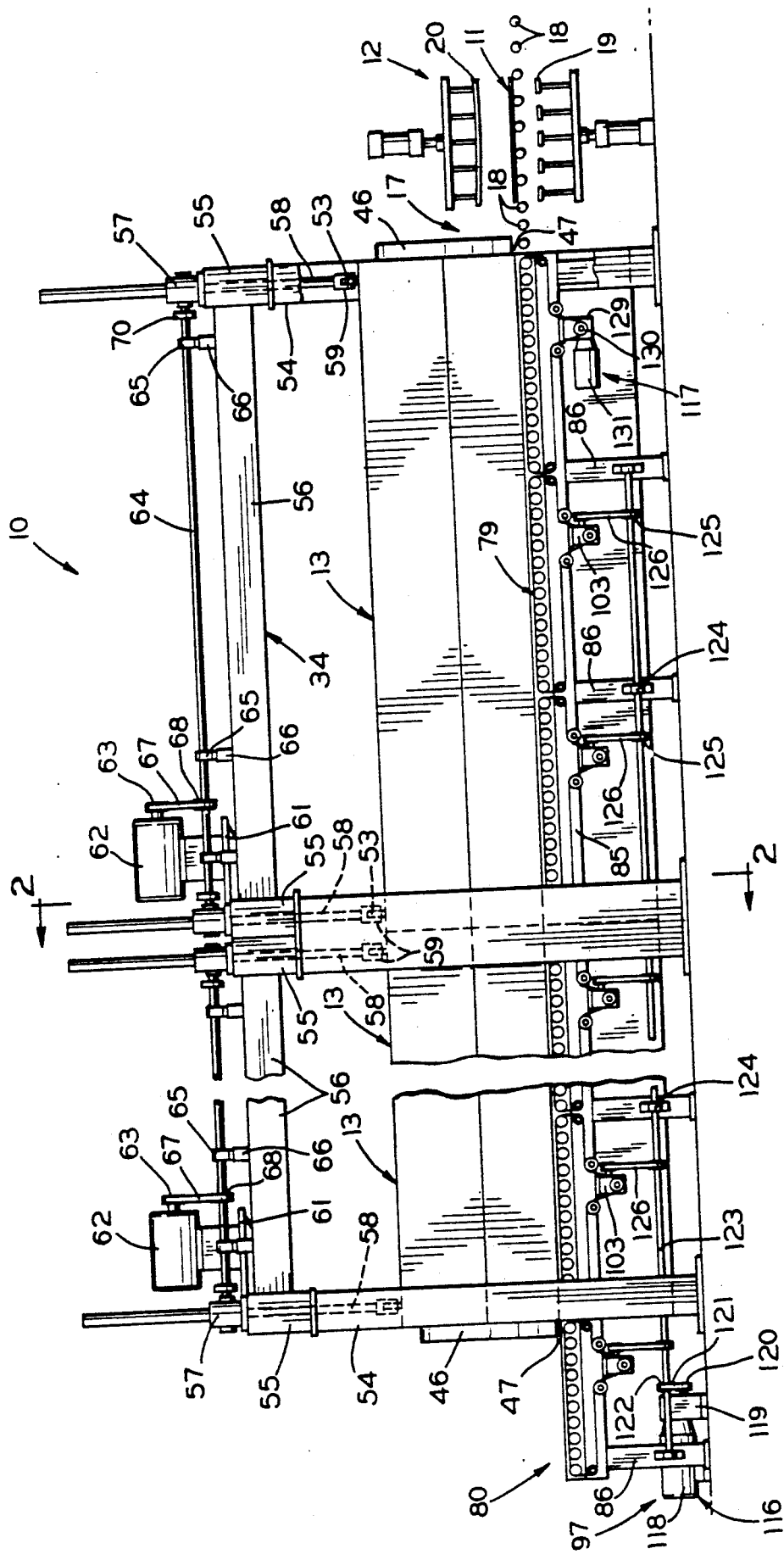
FIG. 1 is a schematic, longitudinal, elevational view of a glass sheet heating furnace constructed in accordance with the invention.

Referring now to the drawings, and in particular to FIG. 1, there is identified generally at 10 a heating furnace in accordance with the invention for delivering suitable heated glass sheets 11 to an adjacent press bending apparatus 12 or other apparatus (not shown) for bending and/or tempering the heated sheets. The heating furnace is formed of a series of individual modular sections 13 arranged in end-to-end relationship for forming the tunnel-type enclosure. Typically, four such modular sections, each on the order of eighteen feet in length, may be employed, although as will be readily apparent the number will be dependent upon a number of factors such as the length of each module and various operating requirements for the furnace.

Figure 2:
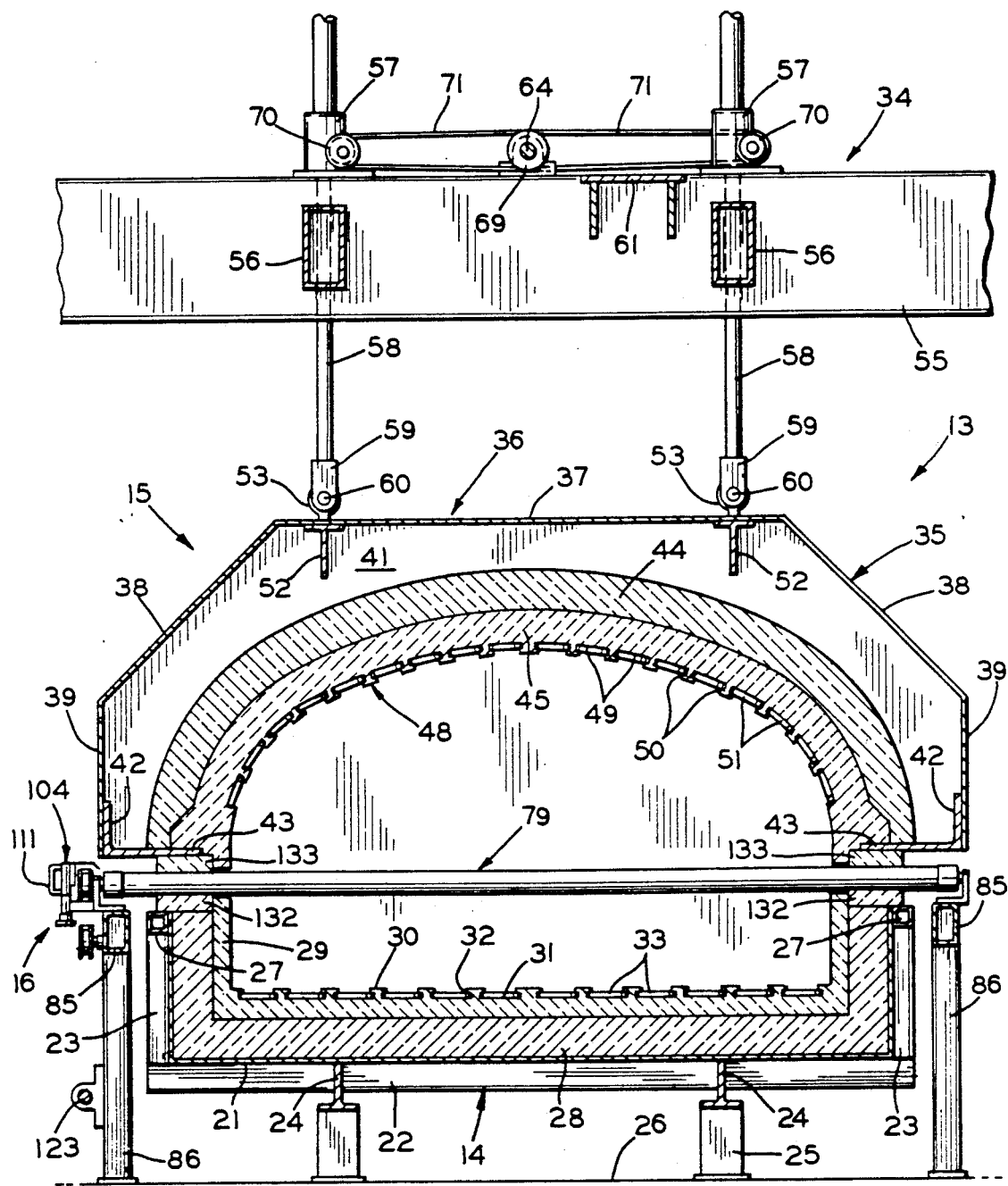
FIG. 2 is a transverse sectional view, taken substantially along line 2—2 of FIG. 1.

As best seen in FIG. 2, each modular section 13 comprises a lower enclosure section 14, an independently supported upper enclosure section 15, and a conveyor section 16 for transporting glass sheets into and through the furnace. At the exit end 17 of the furnace, the sheets 11 are received upon a series of conveyor rolls 18 by which they are carried into the press bending apparatus 12. A lower, segmented female pressing ring 19 lifts the sheets from the conveyor rolls and presses them against an upper male pressing surface 20 in the conventional manner, and then deposits the bent and shaped sheets upon the conveyor rolls for advancement out of the press bending station.

The lower enclosure section 14 comprises a metallic casing 21 carried within a structural framework including cross members 22 and vertical side braces 23. The cross members and casing are supported upon longitudinal beams 24 carried by pedestals 25 resting upon a supporting surface 26 such as a building floor. Tubular longitudinal bracing members 27 are provided along the tops of the side braces 23. The casing 21 is provided with a suitable insulating layer 28, and a refractory lining 29 covers the insulating layer and defines the interior surface of the enclosure. The upper surface 30 of the bottom wall of the refractory lining may be provided with longitudinally extending recesses 31 having throat sections 32 of reduced width. Elongated electric resistance strip heating elements 33 are mounted within the recesses for providing heat within the enclosure beneath the conveyor.

As hereinbefore indicated, the upper enclosure sections 15 of the furnace are mounted for movement between a lowered, operating position as shown in the drawings, and a raised, access position (not shown) To that end, the upper enclosure sections 15 are suspended from a free standing framework, shown generally at 34, supported upon the floor 26. Each unit or module of the enclosure section comprises an outer casement 35 serving as a framework for the section. As will be hereinafter described, an important aspect of the invention is the novel configuration of the section defining the interior cap or roof of the upper enclosure section, that is, the shape of the surface facing the glass sheets as they advance through the furnace on the conveyor 16. While the shape of this interior surface will be dictated by certain parameters of the invention, the exterior configuration of the casement 35 may take such form as will suitably provide economical structural integrity for the enclosure section. Thus, in a preferred embodiment illustrated in FIG. 2, the casement 35 comprises an external shell 36 formed of a top cover plate 37, angled corner plates 38 and oppositely disposed vertical side plates 39. An arch member 40 is connected to the cover plate 37 by rib sections 41 at intervals spaced longitudinally therealong. The arch member may, for example, be a sheet of corrugated metal on the order of one inch (25.4 mm) deep having the corrugations extending transversely of the furnace and formed generally to correspond to the configuration of the interior roof surface facing the conveyor.

Angle shaped support members 42 having inwardly directed horizontal legs 43 are affixed along the lower extremities of the casement 35. A layer 44 of insulating material is disposed along and suitably secured to the lower surface of the arch member 40, and a refractory cap 45 is positioned beneath the insulating layer The arch-shaped layer 44 and cap 45 are supported at their lower edges upon the horizontal leg 43 of the member 42. A wall 46 at each end of the furnace (FIG. 1) encloses the upper enclosure section 15 above the conveyor. A suitable gap 47 is provided between the wall and the conveyor for permitting passage of the sheets 11 into and out of the furnace on the conveyor.

The refractory cap includes an exposed surface 48 facing the interior of the furnace and, in particular, the glass sheets as they move through the furnace on the conveyor 16. There may be formed in the surface a plurality of spaced, longitudinally extending recesses 49 having throat sections 50 of reduced width for receiving and retaining elongated electric resistance strip heating elements 51. The heating elements are connected to a source of electrical energy (not shown) in the conventional manner for providing heat to the furnace chamber as will be described.

In order to suspend the casement 35 from the supporting framework 34, there is affixed beneath the top cover plate 37 longitudinally extending braces 52. Lift rings 53 are provided above the braces at selected locations along the modular sections 13. Such rings may, for example, be located adjacent each end of each modular section 13 as in the embodiment illustrated in FIG. 1, for enabling raising of each module section independently of the others. Alternatively, where the modular sections are interconnected in the assembled furnace for simultaneous retraction, the lift rings 53 may be located intermediate the ends to reduce the required number of lifting jacks.

As shown in FIGS. 1 and 2, the supporting framework 34 for the upper enclosure section includes vertical columns 54 supported upon the floor 26 on either side of the furnace. Cross beams 55 extending over the furnace are supported at their opposite ends upon the columns. The cross beams 55 are interconnected by spaced longitudinal bracing members 56. Screw jacks 57 carried by the beams 55 and positioned above the lift rings 53, have extensible lift rods 58 vertically aligned with the lift rings 53. The lift rods are connected at their lower ends by means of clevises 59 and pins 60 to the lift rings. Thus, by appropriately operating the screw jacks to retract or extend the lift rods, the upper enclosure section can be raised and lowered.

Drive means is provided for operating a number of the screw jacks in unison to insure that the upper enclosure section or sections do not become skewed as they are raised and lowered. The furnace has been illustrated in FIG. 1, and will be described herein, as including separate drive means for lifting each modular section 13. However it will be understood, and it is fully contemplated, that a single drive means may operate all of the screw jacks for raising and lowering the entire upper enclosure section 15 as a unit.

More particularly, there is mounted on a base 61 affixed to a across beam 55 above the upper enclosure section, a reversible motor-driven gear reduction unit 62 having an output drive pulley 63. A counter shaft 64 mounted in bearings 65 carried by cross members 66 affixed to the longitudinal bracing members 56, extends longitudinally intermediate opposed pairs of the screw jacks. A suitable belt or chain 67 drivingly connects the output drive pulley 63 to a pulley 68 affixed to the countershaft 64 for driving the countershaft. Pulleys or gears 69 appropriately positioned along the countershaft are, in turn, drivingly coupled to like pulleys or gears 70 on the input shafts of the screw jacks 57 by belts or chains 71. Thus, by operating the unit 62 in the appropriate direction, all of the screw jacks 57 coupled to the countershaft 64 will be simultaneously driven to raise or lower the associated upper enclosure section.

In accordance with the invention, the interior surface of the upper enclosure section, that is, the roof facing the glass sheets as they are carried through the furnace on the conveyor, is of a novel configuration. Heretofore, such furnaces have generally been constructed for the purpose of providing uniform heating of glass sheets across the width of the furnace. To that end, early furnaces were constructed with flat roofs located some distance above the path of the glass sheets therethrough. Thereafter, furnaces were proposed having flat roofs located closer to the glass, and with radiant heating elements incorporated in the roof for heating the sheets. Still other furnace designs have been proposed employing a roof which is semi-circular in cross section, and which may have radiant heating elements incorporated therein or used in conjunction therewith.

The configuration of the refractory roof facing the glass sheets as they travel through the furnace has a direct correlation to the pattern by which heat is imparted to the sheets. Thus, the heated refractory itself radiates heat to the sheets in addition to that applied directly from heating units within the furnace Where the heating elements are incorporated into or follow the contour of the refractory roof, the configuration is of particular significance. Thus, the total amount of heat received by the glass in such furnaces is a function of the furnace cross-sectional shape.

The intention heretofore in furnace design has generally been to utilize the furnace to heat the glass passing therethrough uniformly from side to side across the furnace. Should any variation in the temperature profile across the sheet be desired, it was created by means of so-called differential heaters positioned to apply additional heat directly to specific areas as necessary. In producing present day bent glass units, it has been found desirable in many instances for the glass sheets to have temperature profiles varying according to a predetermined pattern as they exit the heating furnace in order to facilitate bending. While this temperature variation may be created by means of differential heaters, it has been found advantageous in accordance with the present invention for the furnace itself in certain instances to be capable of creating a non-uniform temperature profile in the sheets. Should modification of the furnace-produced temperature profile be desired, it can then be accomplished by means of differential heaters.

It is known that due to the fact that a heater in a flat furnace roof will radiate the maximum amount of heat to the glass directly beneath it, the flat configuration is relatively ineffective in distributing heat uniformly. Thus, in order to achieve a specific temperature profile, a significant variation in the power requirement to the individual heaters across the cross-section of the furnace is required. Creating and maintaining the necessary variation in watt density undesirably complicates the heater power controls and reduces the available choices in heater selection. In that regard, a roof of semicircular configuration is most effective in distributing heat uniformly from the heaters. It has been found, in fact, that the semi-circular or semi-cylindrical roof configuration is so effective in distributing heat uniformly to the sheets that the furnace is effectively incapable of differentially heating the sheets regardless of variation of watt density by the heating elements.

Figure 5:
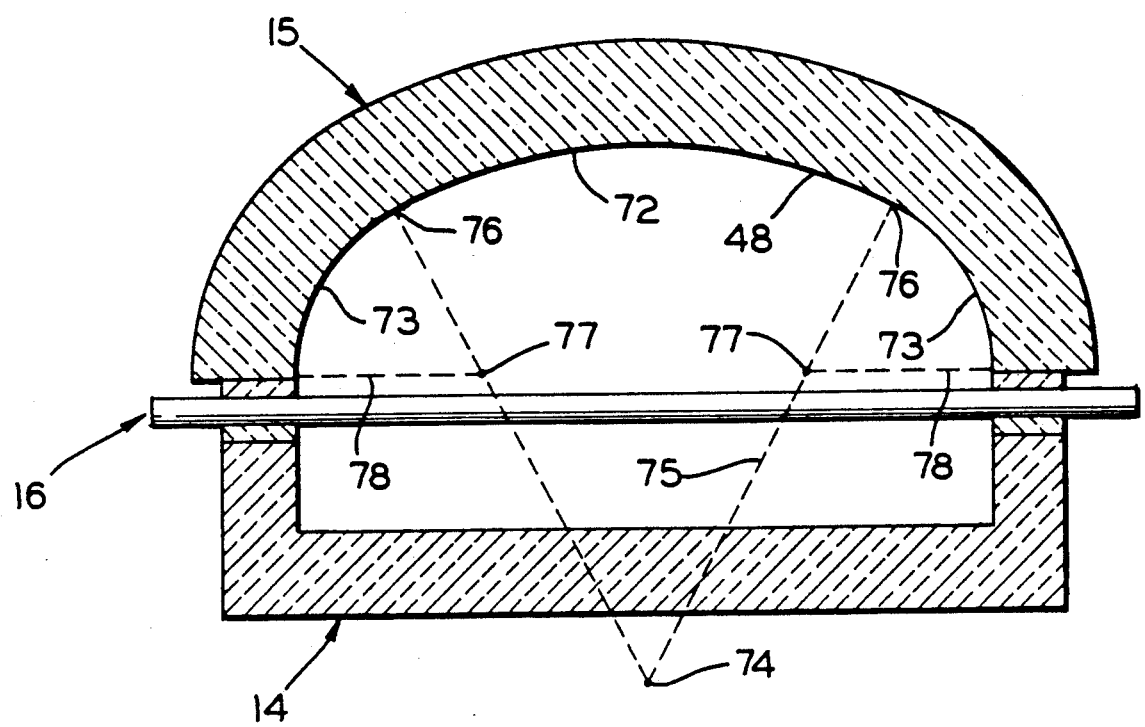
FIG. 5 is a schematic, transverse, elevational view illustrating the configuration of the furnace enclosure.

In accordance with the present invention, it has been determined that a furnace roof or arch as illustrated in FIGS. 2 and 5, having an elliptical configuration in cross section, is advantageous in relatively uniformly distributing heat from the heating elements while simultaneously enabling application of heat differentially across the furnace. Thus, the elliptical roof configuration provides relatively uniform heating in the central region, and allows differential heating of the glass along the side regions of the furnace. For clarity of illustration, the lower and upper enclosure sections 14 and 15, respectively, have been shown in FIG. 5 without the heaters which would normally be associated therewith. However, it will be understood that appropriate heaters such as the heating elements 51 shown in FIG. 2 would be positioned to follow the novel contour of the surface 48 of the refractory cap 45.

The surface 48 is of elliptical configuration, defined by an intermediate arcuate segment 72 having a relatively large radius of curvature, and arcuate segments 73 along either side having smaller radii of curvature. More particularly, the surface may comprise the segment 72 defined by a circular arc generated from a center 74 and having a radius as shown at 75, which is tangent at its extremities 76 with the segments 73 defined by circular arcs generated from centers 77 and having radii as shown at 78.

The distance of the midpoint of the arcuate segment 72 above the glass path, as well as the radii 75 and 78 of the arcuate segments 72 and 73, respectively, will be suitably selected upon the basis of a number of factors including the maximum watt density available in heating elements, minimum furnace height dictated by production requirements for heater replacement, glass pile up and installation of auxiliary equipment, and economy of construction. By way of example, a preferred embodiment in a furnace having an interior width of 84 inches (213.36 cm) between the sides, has a center height above the base of the refractory cap 45, that is, above the horizontal legs 43 of the support members 42, of 25 inches (63.50 cm). The radius 75 is 64.396 inches (163.57) and the radius 78 is 18.547 inches (47.11 cm).

With reference now particularly to FIGS. 3 and 4, the conveyor 16 of the invention comprises a plurality of spaced individual rollers 79, longitudinally aligned and positioned between the lower and upper enclosure sections 14 and 15 so as to carry individual glass sheets from a loading station 80 at the entrance to the furnace 10, into and through the furnace for transfer to the rolls 18, by which they are carried into the press bending apparatus 12. Such rollers for present day furnaces, as hereinabove described, generally have a ceramic work contacting surface and may be fabricated as of fused silica or quartz. Consequently, it may be necessary to periodically remove and replace individual rollers. The novel roll mounting and drive system of the invention is particularly adapted to provide a positive interrelated drive for the entire gallery of rollers, while facilitating rapid removal and replacement of selected individual rollers as becomes necessary.

To that end, the rollers 79 may comprise ceramic cylinders 81 having end caps 82 affixed thereto as disclosed, for example, in Miller U.S. Pat. No. 3,867,748. The end cap at one end of the roller includes a drive axle 83 and the end cap at the other end includes a mounting shaft 84. In order to support the rollers, there is provided along either side of the furnace a longitudinal support beam 85 affixed to posts 86 carried at spaced intervals therealong upon the floor 26. As best seen in FIG. 4, angle members 87 affixed to the support beams as by lag bolts 88 have upstanding legs 89 serving as support plates for the rollers.

More particularly, the support plates are provided at spaced intervals therealong with oppositely disposed pairs of upwardly opening semi-circular recesses 90. The collars of bearings 91 upon the drive axles and mounting shafts 83 and 84, respectively, are received within the recesses 90 for supporting the rolls. Snap retaining rings 92 on the bearing collars are adapted for reception in corresponding retaining ring recesses or grooves 93 formed around the recesses 90 at the inwardly directed faces of the support plates 89. Bearing retainer plates 94 positioned along the face of the support plates and retainer rings restrain the bearing collars against lateral movement, while permitting the rollers and bearings thereon to be lifted from the support plates. Central sleeves 95 of the bearings on the drive axles 83 are affixed to the drive axle as by a set screw 96 to restrain the roller against axial movement. The sleeves 95 of the bearings on the mounting shafts 84, on the other hand, are free to move axially along the shafts to accommodate axial expansion and contraction of the rollers.

It is highly desirable that the rollers throughout the length of the furnace be driven in a positive manner at a known predetermined speed in order to minimize damage to the heated glass sheets as they are conveyed through the furnace. At the same time, it is imperative that the individual rollers be capable of being quickly and easily disengaged from the drive system, and that the drive system not interfere with removal and replacement of individual rollers. To that end, the conveyor 16 is provided with a drive system, identified generally at 97, whereby the rollers are driven in groups in a positive, timed manner. More particularly, there is affixed to the drive axle 83 of each roller 79 a toothed sprocket or drive wheel 98. The upper flight of a timing belt 99 extends over a series or group of the sprockets, the belt having a correspondingly toothed surface adapted to matingly engage the teeth of the sprockets 98. The belt is entrained about first idler pulleys 100 affixed to the support beam 85 beneath the end ones of the group of toothed sprockets 98, and then over second idler pulleys 101 carried by the beam 85 and around a toothed drive sprocket 102 of a right angle gear drive unit 103 affixed to the beam.

One or both of the second idler pulleys 101 may be utilized as adjustable belt tighteners by mounting them in a conventional manner for selective positioning as by being carried by a spring loaded arm (not shown) or otherwise located at different positions along the beam 85. Any number of rollers 79 may be driven by each of the belts 99, the number generally being limited by the lengths and types of belts which are readily available. In modular furnaces of the type envisioned by the invention, the number will generally be some particular portion, such as one half or one fourth, of the total number of rollers of a module. In the embodiment of FIG. 3, for example, the belt 99 drives eighteen of the rollers 79

In accordance with an important aspect of the invention, there is provided along the drive side of the furnace a series of readily removable hold-down assemblies, identified generally at 104 (FIGS. 3 and 4), for maintaining the timing belt 99 in driving engagement with each of the toothed sprockets 98 while enabling the sprockets to be quickly and simply disengaged from the belt for removal and replacement of individual rollers 79 Each individual hold down assembly comprises an elongated side plate 105 to which is affixed a pair of spaced mounting blocks 106. Threaded shafts 107 projecting downwardly from the mounting blocks extend axially through tubular receptacles 108 carried by brackets 109 affixed to the angle members 87. The hold down assemblies are secured in place as by hand wheels 110 threadedly received on the shafts 107 and urging the mounting blocks 106 downwardly against the tubular receptacles 108. Handles 111 are provided on the mounting blocks for manually installing and removing the hold-down assemblies.

A plurality of freely rotatable cam rollers 112 are carried by the side plate 105 at spaced positions therealong on axles 113 affixed to the side plate as by mounting bolts 114. The cam rollers are positioned to rollingly engage the upper surface of the belt 99, with one cam roller intermediate each adjacent pair of the toothed sprocket or drive wheels 98 to depress the belt between the drive wheels and insure that the teeth on the timing belt will be continuously intermeshed with the teeth of the drive wheels. A shield plate 115 affixed to the side plate 105 extends over the line of cam rollers as a safety measure and to prevent any glass which may shatter while on the rollers from flying into the belt and sprocket drive mechanism. The hold down assemblies 104 are positioned end-to-end along the furnace so that one of the cam rollers is positioned between each pair of adjacent toothed sprockets 98, and are of such length as to be readily installed and/or removed by one person. Thus, as shown in FIG. 3, two such assemblies may advantageously be employed with each segment of rollers driven by a single timing belt 99.

Although separate power units may be provided for driving each of the gear drive units 103, all or any number of the drive units may advantageously be driven by a common power unit. In the preferred embodiment of FIG. 1, for example, all of the rollers from the entrance end of the furnace up to the final section, where the sheets are transferred to the press bending apparatus, are driven by a single conveyor drive unit 116. The final section is driven by a separate transfer section drive unit 117 so that it may be appropriately cycled to accelerate movement of the heated sheets into the press bending apparatus.

The drive unit 116 includes a motor 118 connected to a gear reduction unit 119 having an output shaft and sprocket 120. The output sprocket is coupled by means of a drive chain or belt 121 to a sprocket 122 on a line shaft 123 rotatably journalled in bearings 124 affixed to the support posts 86. The line shaft extends along the furnace and has affixed at appropriate locations therealong, sprocket wheels 125. The sprocket wheels are connected by drive chains or belts 126 to drive sprockets 127 on the input shafts 128 of the right angle gear drive units 103. Thus, the entire body of rollers up to the transfer section is driven in a timed manner by the drive unit 116.

As explained above and as will be seen in FIG. 1, the final or transfer section of the rollers is driven independently from the remainder of the rollers by the transfer section drive unit 117. The drive unit more specifically comprises a gear box 129 having a toothed drive sprocket 130 which drivingly engages the timing belt 99. The gear box is driven as by a variable speed motor 131 having suitable conventional controls (not shown) whereby the rollers of the transfer section can be so operated as to expeditiously advance heated glass sheets from the furnace into the press bending apparatus.

Provision is made for enclosing the side area of the furnace around the rollers 79 and between the upper and lower enclosure sections to isolate the furnace interior from the ambient external atmosphere. In order to do so while permitting the rollers to be readily removed and replaced, as best seen in FIG. 2 a lower roll packing member 132 is disposed atop each side wall of the lower enclosure section to enclose, in conjunction with cooperating upper roll packing members 133, the area between and around the individual rollers.

Figure 6:
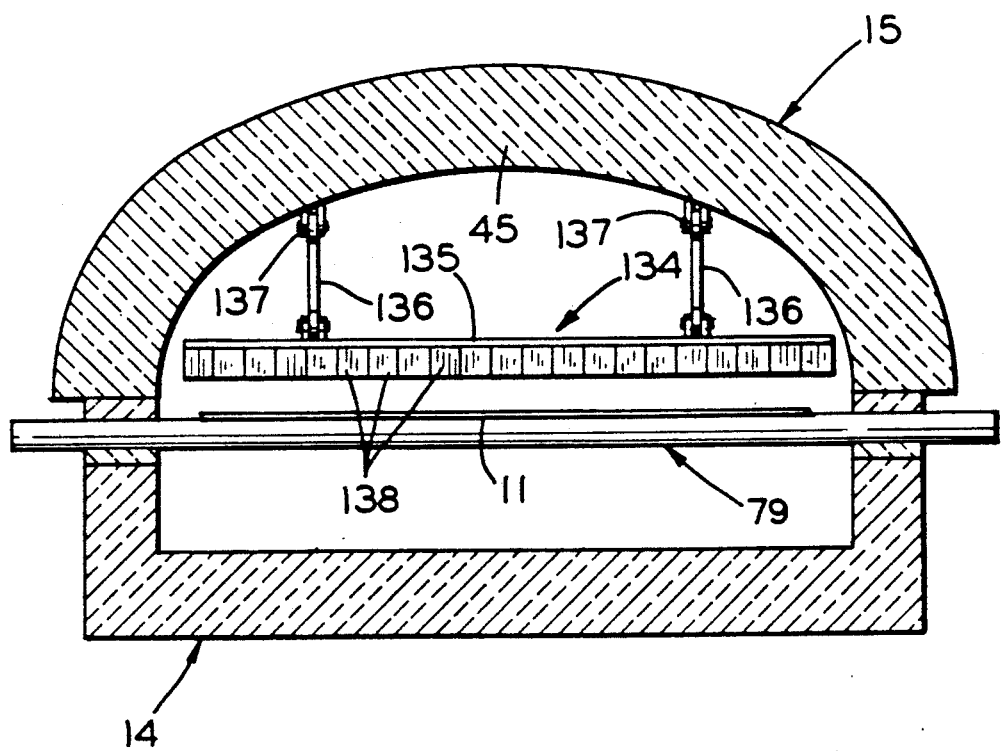
FIG. 6 is a view similar to FIG. 5, illustrating a differential heating assembly within the furnace enclosure.

As hereinabove described, the furnace construction in accordance with the invention is such, due to the novel elliptical configuration of the cap 45, as to facilitate differential heating of the sheets by means of the heating elements associated with the cap. Should it be necessary or desirable to modify the differential heating capability of the furnace beyond that which can be achieved with the basic structure, or to supplement the heating in certain areas, it is contemplated that additional differential heating means may be provided. Thus, as shown in FIG. 6 there is provided beneath the cap 45 and over the path of the glass sheets 11 on the rollers 79, a supplemental differential heating assembly, identified generally at 134. Such a differential heating assembly is disclosed and described in detail in copending application Serial No. 07,355,169, filed May 22, 1989, which disclosure is incorporated herein by reference and to which reference may be had for a full understanding of the device. Briefly, and as shown in FIG. 6, the supplemental heating assembly may be provided at selected locations along the length of the furnace, and generally comprises carrier members 135 extending transversely within the upper enclosure section 15 suspended relatively closely above the path of the glass sheets as by hangers 136 affixed to brackets 137 in the furnace cap Longitudinally extending heating elements 138 carried by the members 135 face the glass sheets to provide radiant heat thereto. The heating elements may be controlled individually to provide heat in selected amounts and thereby create a predetermined modified heating pattern across the furnace.

It is to be understood that the forms of the invention herein shown and described are to be taken as preferred embodiments only of the same, and that various changes in the size, shape and arrangement of parts, as well as various procedural changes may be made without departing from the spirit of the invention or the scope of the following claims.

What is claimed is:

1. A conveyor for carrying glass sheets through a heating furnace including a lower enclosure section beneath said conveyor and an upper, vertically retractable enclosure section above said conveyor, said upper and lower enclosure sections cooperating to define an elongated, horizontally extending heating chamber, said conveyor comprising a supporting framework including beam means extending longitudinally along each side of said lower enclosure section and outwardly thereof, a support plate affixed to each said beam means, means defining upwardly opening recesses at spaced intervals along each said support plate, a plurality of rollers extending between said support plates and rotatably supported at their ends in said recesses, a drive wheel affixed to one end of each said roller, said drive wheels being in longitudinal alignment, drive belt means extending over the tops of a plurality of said drive wheels, cam rollers positioned to rollingly engage the upper surface of said drive belt means between adjacent ones of said drive wheels to depress said drive belt and urge it downwardly into driving engagement with said drive wheels, and drive means operatively associated with said drive belt means for advancing said drive belt and simultaneously rotating said plurality of rollers 2. A conveyor for carrying glass sheets through a heating furnace as claimed in claim 1, wherein said drive wheels include a toothed periphery, and said drive belt means comprises a timing belt whose surface engaging said drive wheels is complementary to said toothed periphery.

* * * * *